United States Patent
Callis, Jr.

(10) Patent No.: US 7,066,075 B1
(45) Date of Patent: Jun. 27, 2006

(54) PNEUMATIC TRANSBRAKE ACTUATOR OR SOLENOID FOR DRAG RACING VEHICLES

(76) Inventor: Julius Clifton Callis, Jr., 104 Woodbridge Pl., Reynoldsburg, OH (US) 43068

( * ) Notice: Subject to any disclaimer, the term of this patent is extended or adjusted under 35 U.S.C. 154(b) by 0 days.

(21) Appl. No.: 10/990,687

(22) Filed: Nov. 16, 2004

(51) Int. Cl.
*F15B 11/08* (2006.01)

(52) U.S. Cl. .......................... 91/461; 192/221
(58) Field of Classification Search ................ 91/361, 91/461
See application file for complete search history.

(56) References Cited

U.S. PATENT DOCUMENTS

| | | | |
|---|---|---|---|
| 5,471,894 A | 12/1995 | McFadden | 74/336 R |
| 5,622,088 A | 4/1997 | Reid | 74/606 R |
| 5,722,293 A | 3/1998 | McFadden | 74/336 R |
| 5,839,419 A * | 11/1998 | Hawley | 123/398 |
| 6,050,384 A | 4/2000 | Hammond | 192/221 |
| 6,406,398 B1 * | 6/2002 | Hughes et al. | 475/116 |
| 6,678,214 B1 | 1/2004 | McMahon | 368/6 |
| 6,721,648 B1 | 4/2004 | Masters et al. | 701/110 |
| 6,814,196 B1 * | 11/2004 | Voit | 192/13 R |

OTHER PUBLICATIONS

DTS Nostalgia Muscle Car, http://www.fasteststreetcar.com/2004/rules/n-musclecar.html, 8 web pages dated Sep. 24, 2004.

* cited by examiner

*Primary Examiner*—Thomas E. Lazo
(74) *Attorney, Agent, or Firm*—Roger A. Gilcrest

(57) ABSTRACT

The present invention is a transbrake system for a transmission of a drag race car, the transmission comprising: (a) a transmission housing having an exterior, typically of aluminum; (b) a transmission valve body contained in the transmission housing; the transmission housing having an aperture connecting the exterior of the transmission housing with the transmission valve body; (c) a pneumatic solenoid disposed outside the transmission housing and having an actuating piston extending through the aperture to the transmission valve body, so as to be moveable from a position braking the transmission to a position releasing the transmission; (d) a source of compressed air; (d) an electrical air control valve to control the supply of compressed air from the source of compressed air to the pneumatic solenoid; (e) a fluid conduit extending from the electrical air control valve to the pneumatic solenoid.

12 Claims, 5 Drawing Sheets

PNEUMATIC TRANSBRAKE ACTUATOR OR SOLENOID FOR DRAG RACING VEHICLES

BACKGROUND OF THE INVENTION

In bracket drag racing, where there are numerous drivers who compete in heats comprising two drivers, there are two criteria that a driver must meet to win the race. First, the driver must cross the finish line sooner that the other driver in their heat. Second, the time of the winning driver in each heat is compared with a target time. The driver who wins his heat and comes closest to the target time without going under the target time wins the overall race. For example, in a race with a target time of 8.90 seconds, a driver who reaches the finish line with a time of 8.89 seconds will lose the race to the driver whose time was 8.906 seconds. Therefore, in this type of racing, accurate timing is as critical as winning the race. There is a need for drivers to measure every aspect relevant to the vehicle acceleration functions.

It is common at the beginning of the race for the driver to engage the transmission into the lowest forward gear by a shifter inside the race car. When the car is staged on the starting line, the driver presses down on a release button (called a transbrake button), and holds the button down. The transbrake engages the transmission into reverse gear and forward gear at the same time so the torque of the engine at high RPM cannot move the race car. When the transbrake is released the reverse gear is disengaged and the race car can move forward.

The transbrake is kept engaged by the driver holding down a release button on the transbrake control panel. To begin the race, a number of lights at the starting line of the race track are illuminated in sequence (amber-green) to signal to the driver the start of the race. When the green signal is indicated, the driver releases the transbrake button, which in turn releases the transbrake. The release of the transbrake causes the engine torque to act on a driveshaft, causing it to turn. The vehicle then begins to accelerate.

Transbrake arrangements of the prior art are described in U.S. Pat. Nos. 6,678,214 B1; 6,406,398 B1; 6,050,384 B; and 5,622,088; which are hereby incorporated herein by reference.

Drag racing of this type typically requires several races over a single day of competition, requiring a competitor to make several runs to be successful.

One of the problems encountered in drag racing is that transbrakes are controlled by electric solenoids must be affixed directly to the transmission housing in order that their actuating rod reach into the transmission valve body. The transmission housing rapidly heats up, in turn causing the electric circuitry of the electric solenoid to overheat over the course of a racing day, and this often leads to their failure during later race runs. The overheating of the electric solenoid typically occurs at the starting line. The failure of the electric solenoid causes the reverse gear to disengage. With no reverse gear engaged, the driver is forced to use the brake pedal to hold the racer car still on the starting line through foot braking. When leaving the starting line by foot braking, reaction times will be either too slow or too fast, and this leads to less than optimal starting performance causing the racer to lose the race.

The use of electrical solenoids has presented a long-standing problem for drag racers in that they remain a source of risk of disqualification.

It is therefore an object of the present invention to provide a novel and improved transmission and transbrake system which overcomes the above-noted problems in the prior art.

SUMMARY OF THE INVENTION

The invention is a racing automotive transmission, with a pneumatically driven solenoid. The pneumatically driven solenoid allows the driver to make several drag racing runs without the risk of failure due to overheating as in electrical solenoids.

In general terms, the present invention includes a transmission for a race car, the transmission comprising: (a) a transmission housing having an exterior (typically an aluminum casing); (b) a transmission valve body contained in the transmission housing; the transmission housing having an aperture connecting the exterior of the transmission housing with the transmission valve body; (c) a pneumatic solenoid disposed outside the transmission housing and having an actuating piston extending through the aperture to the transmission valve body, so as to be moveable from a position braking the transmission to a position releasing the transmission; (d) a source of compressed air; (e) an electrical air control valve to control the supply of compressed air from the source of compressed air to the pneumatic solenoid; (f) a fluid conduit extending from the electrical air control valve to the pneumatic solenoid.

The present invention may be used in any racing transmission, such as those commercially available from General Motors, Mopar or Ford.

Preferably, the electrical air control valve is disposed remote from the transmission housing or other source of engine heat, so as to be a sufficient distance from the transmission housing so as to be maintained at a temperature below which the electrical air control unit is subject to failure. It is believed that the electrical air control valve should be positioned a sufficient distance from the transmission housing so as to be maintained at a temperature below about 250 F and preferably below 225 F over the course of a racing day; typically for instance a distance of at least 6 inches from the transmission housing, or otherwise shielded using known materials.

The transmission also includes a switch connected to the electrical air control valve, the switch disposed at distance remote from the electrical air control valve. This switch is typically mounted on the steering wheel where the driver can operate the transbrake without taking his hand from a position controlling the race car.

The source of compressed air may be any source of air sufficient to operate the pneumatic solenoid (typically a compressed air container at a pressure of about 1800 psi), such as a compressed air tank or bottle (which typically has a regulator to 85 psi) mounted in an appropriate location onboard the race car. The air bottle has a valve that is screwed into the bottle. This valve allows the compressed air flow to be turned off or on. The valve also has a pressure regulator which can be adjusted to the operating pressure or it may be pre-set at the manufacturer, typically from 80 to 100 psi. A compressed air conduit extends from the air source to the pneumatic solenoid, and its compressed air flow controlled by the electrical air control valve.

The fluid conduit may be of any grade appropriate to safety carry the compressed air supplied to the pneumatic solenoid.

The pneumatic solenoid may be control valve attached to the transmission housing by way of a threaded fitting in a position that directs the actuating rod of the solenoid into the transmission valve body. This may be done through the use of an adapter that adapts the standard automotive threads to threads that may be provided on the pneumatic solenoid body.

The transbrake solenoid of the present invention may be used in the sport of drag racing as is appreciated by those skilled in the art. The transbrake solenoid may be used in conjunction with an existing modified or new valve body used in 2-speed or 3-speed aluminum drag racing transmissions to keep a drag racing car at a dead stopped position on starting line. In using the transbrake on a drag strip, the following steps are typically taken at the start of a race:

1. The race car is engaged into the lowest forward gear by the driver with a shifter inside the race car 2. The driver stops the race car on the starting line by pressing down on the brake pedal.

3. The race car's transmission is engaged in reverse gear when the driver presses down a release button on the steering wheel (the "transbrake button," typically a push on, release off button).

4. When the transmission is in forward and reverse at the same time, the race car will not move. The race car driver will take his foot off the brake pedal.

5. The engine is revved to high pre-set r.p.m. for launch off the starting line.

6. The transmission comes out of reverse gear when the driver releases the transbrake button at the start of the race allowing the race car to launch and run through the ⅛ or ¼ mile race course.

The advantages of the present invention include its ability to operate on compressed gas or air. It will also maintain the same speed of action up to 350° F. The air valve also offers continuous off/on duty with a 1 amp draw and no overheating. The actuator may also be made to be completely adjustable for any stroke distance required of a given transmission valve body. The pneumatic transbrake of the present invention may be made to be operable only when the race transmission is in lowest gear for safety.

DETAILED DESCRIPTION OF THE PREFERRED EMBODIMENT

In view of the foregoing summary, the following presents a detailed description of the preferred embodiment which is presently considered to be the best mode.

Figure 1:
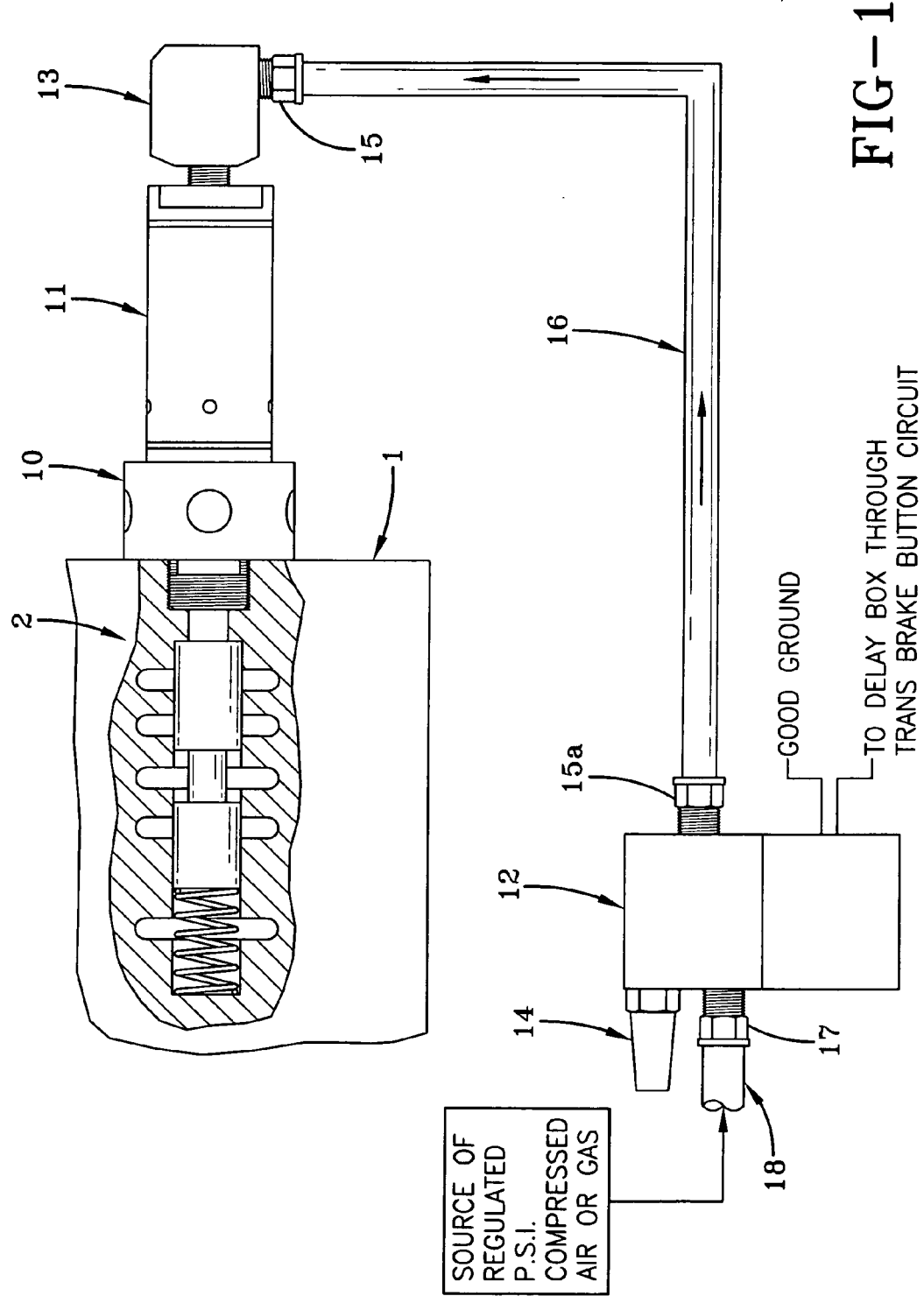
FIG. 1 shows a schematic of a pneumatic transbrake system in accordance with one embodiment of the present invention.
Figure 1A:
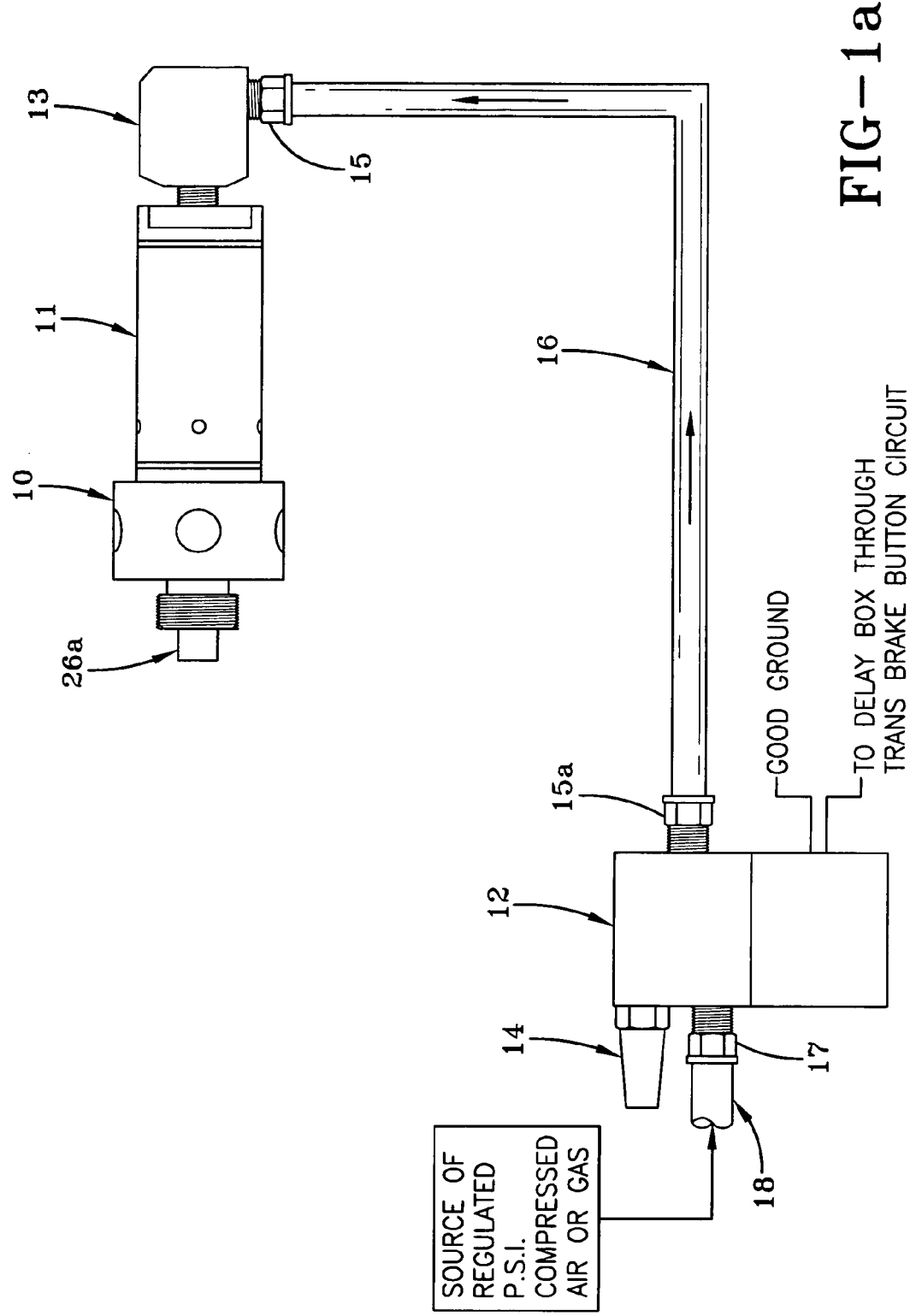
FIG. 1a shows a schematic of a pneumatic transbrake system in accordance with another embodiment of the present invention.

FIG. 1 shows a schematic of a pneumatic transbrake system in accordance with one embodiment of the present invention. FIG. 1 shows modified drag racing transmission 1 shown sectioned to expose modified valve body 2. On the outside of the modified drag racing transmission 1 is attached aluminum adaptor 10 adaptor aluminum that is designed and manufactured by the inventor at Callis Machine Works (CMW) of Reynoldsburg, Ohio. Aluminum adaptor 10 connects air cylinder 11 to drag race transmission through ¹¹⁄₁₆ 12-thread hole in the housing of the 2 speed forward modified racing transmission 1. As an alternative, a 0.685 hole in a modified 3 speed forward transmission. These holes were originally used by the automaker for the vacuum modulator. The 0.682 inch diameter adaptor may be held in place by a U-clamp.

Pneumatic cylinder 11 is an air cylinder 1¹⁄₁₆ inch bore single acting spring return. It is preferred that it have the following specifications: (1) a 0.220 inch stroke threadless piston rod, (2) high temperature seals & piston boots, and (3) automatic transmission fluid compatible seals and boots. An air cylinder of this type typically must be custom fabricated to specifications to fit the intended transmission type.

FIG. 1 also shows the pneumatic directional control valve 12 which is a 3-way air valve operating at 12 volts. The pneumatic directional control valve 12 may be obtained commercially from the Aro Fluid Products Division of Ingersoll Rand of Bryan, Ohio. The pneumatic directional control valve 12 has two leads, one for ground and another that is connected to the delay box through a transbrake button circuit as is known in the art.

Also shown in FIG. 1 is quick exhaust valve 13, such as a Clippard Minimatic, serial number JEV-FZMZ obtained commercially from Clippard Corporate of Cincinnati, Ohio. This valve is attached by brass tube fitting 15 which is a compression self aligning fitting with ¼ outside diameter tube and ⅛ NPT male threads. It has a maximum operating pressure of 300 p.s.i. and a maximum operating temperature of 450° F.

The tubing 16 connects the pneumatic directional control valve 12 and the quick exhaust valve 13 and/or pneumatic cylinder 11, and is preferably Teflon pipe tubing with ¼ inch outside diameter and with ³⁄₁₆ inch inside diameter. It has a maximum operating pressure of 168 p.s.i. and a maximum operating temperature of 500° F. The tubing also has a brass tube fitting 15a (like 15) connecting it to the pneumatic directional control valve 12. The tubing 16 will be of sufficient length to place the pneumatic directional control valve 12 sufficiently far away from the heat of the transmission and other engine components so as to allow the pneumatic directional control valve 12 to operate within a temperature range such that its function will not be compromised as portions of the engine heat up and remain hot during the period of operation over a day of racing.

Attached to pneumatic directional control valve 12 is a bronze/steel exhaust muffler/filter that has ⅛ inch NPT male threads. Also attached to pneumatic directional control valve 12 is brass instant tube fitting 17 with ¼ inch outside diameter tube and ⅛ NPT male threads. It has a maximum operating pressure of 300 p.s.i. and a maximum operating temperature of 200° F. This fitting in turn connects to ether based polyurethane tubing 18 having ¼ inch outside diameter and ⅛ inch inside diameter. It has a maximum operating pressure of 194 p.s.i. and a maximum operating temperature of 165° F. The polyurethane tubing 18 in turn is connected to a source of compressed air that is pressure regulated, such as that from a small compressed air bottle (typically 2 inches in diameter and 13 to 14 inches long) with a pressure regulator.

Figure 2A:
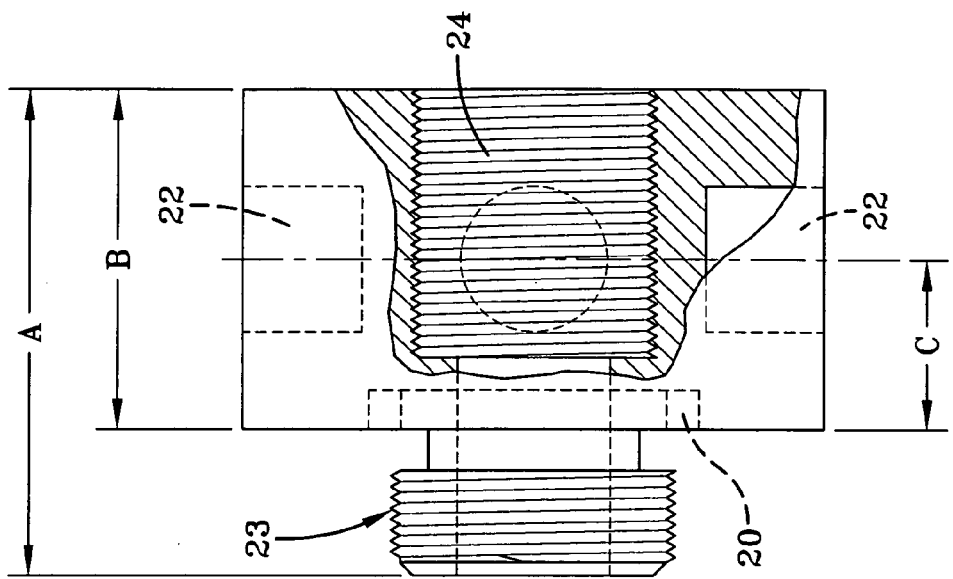
FIG. 2a shows a detailed partially sectioned side view of an adaptor used in accordance with one embodiment of the present invention.
Figure 2:
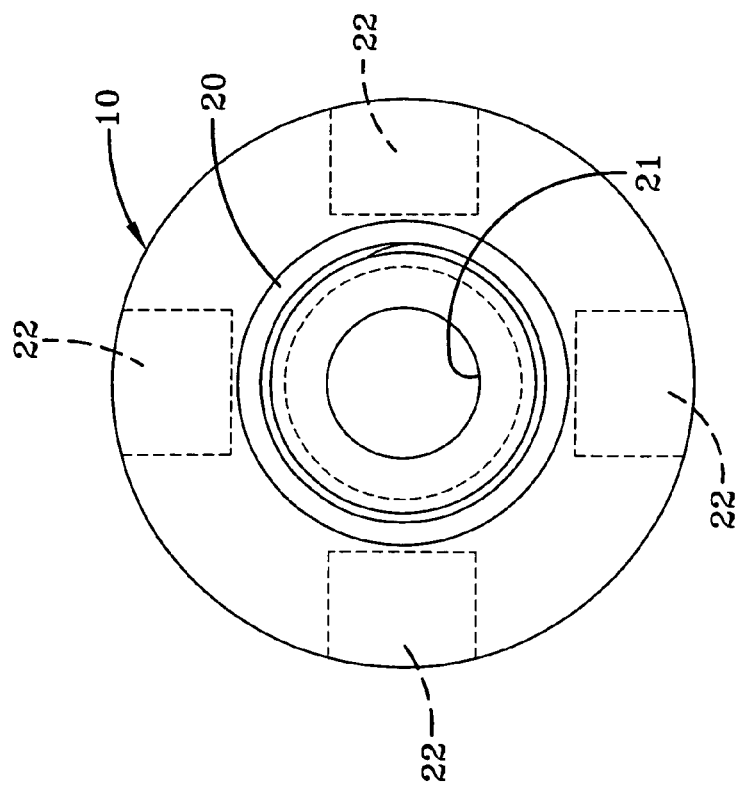
FIG. 2 shows a detailed axial view of an adaptor used in accordance with one embodiment of the present invention.

FIG. 2 shows a detailed axial view of an adaptor 10 for a 2 speed transmission used in accordance with one embodiment of the present invention. FIG. 2 shows adaptor 10 of aluminum having O-ring groove 20 (0.940 inch outside diameter; 0.685 inch inside diameter and being 0.100 inch deep), a central bore 21 of 0.257 inch inside diameter and four side bore holes 22 that are ⅜ diameter and 0.375 inch deep.

FIG. 2a shows a detailed partially sectioned side view of an adaptor 10 for a 2 speed transmission used in accordance with one embodiment of the present invention. This view shows the side bore holes 22 and threaded portion 23 which is 11/16 inch having 12 threads. This view also shows the threaded interior bore 24 that is ⅝ inch 18 tapped 0.700 inch deep. Dimension A of FIG. 2a is 1.275 inch. Dimension B of FIG. 2a is 0.900 inch. Dimension C of FIG. 2a is 0.450 inch.

Figure 3:
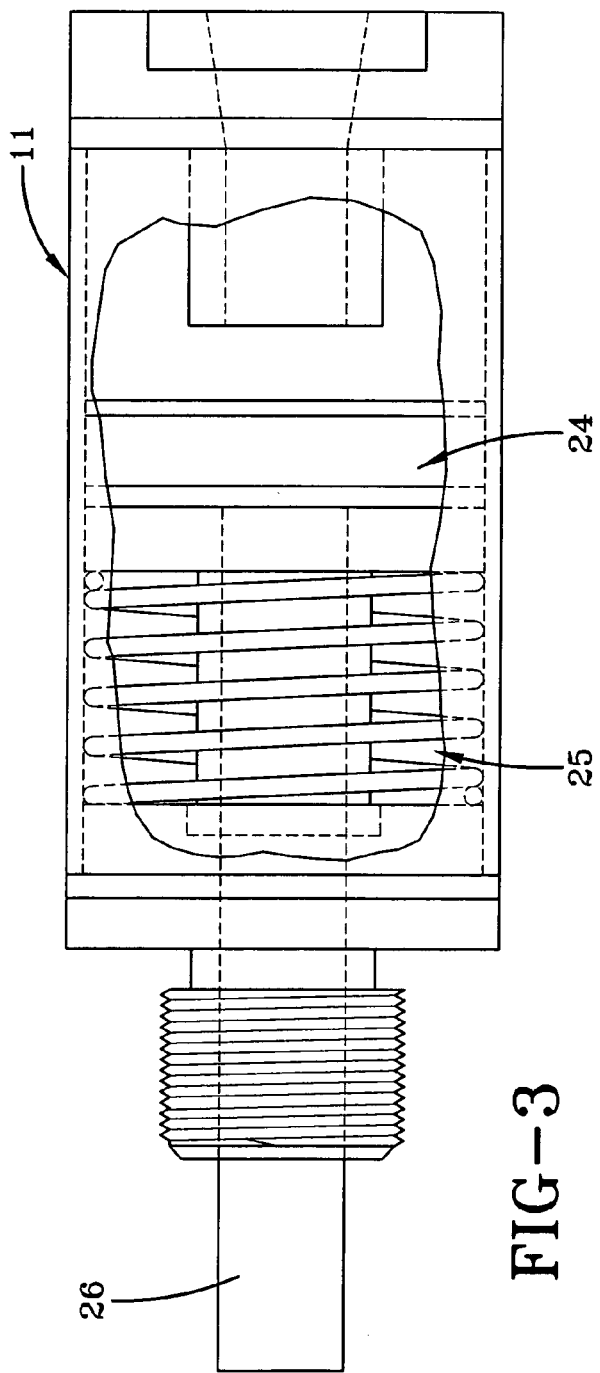
FIG. 3 is a detailed partially sectioned side view of a piston cylinder assembly used in accordance with one embodiment of the present invention.

FIG. 3 shows a detailed view of pneumatic cylinder 11, showing piston 24, piston cylinder assembly and piston rod 26. In a preferred embodiment, the piston rod 26 may be reduced in diameter to allow it to operate on a wider variety of transmissions. This can be seen more clearly as item 26 in FIG. 3 (all numbers referring to equivalent parts in FIG. 1).

Figure 4:
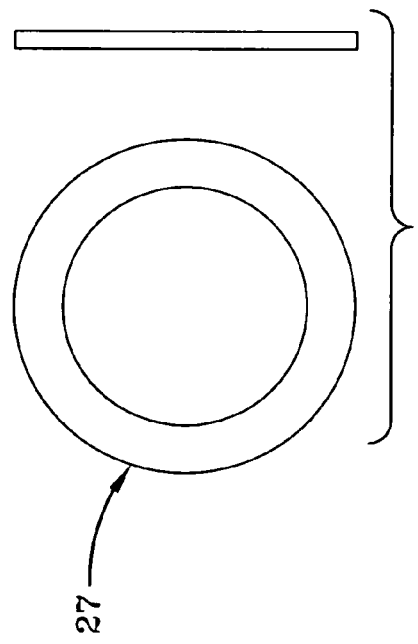
FIG. 4 shows detailed axial and side views of a shim member that may be used in accordance with one embodiment of the present invention.

FIG. 4 is a detailed axial and side view of a shim 27 member that may be used in accordance with one embodiment of the present invention. The shim 27 may be used to adjust the relative position of the pneumatic cylinder 11 with respect to the transmission housing 1, and may be provided in an assortment of thicknesses, such as 0.005, 0.010, 0.015, 0.020 and 0.030 inch.

The pneumatic transbrake actuator of the present invention may be used in modified 2-speed and 3-speed automatic aluminum-cased transmissions used in the sport of drag racing.

In the 2-speed modified transmission, the pneumatic transbrake actuator is screwed into place at the rear of the transmission. An 11/16 12 threads tapped hole is used. This gives access to the modified valve body.

Figure 5A:
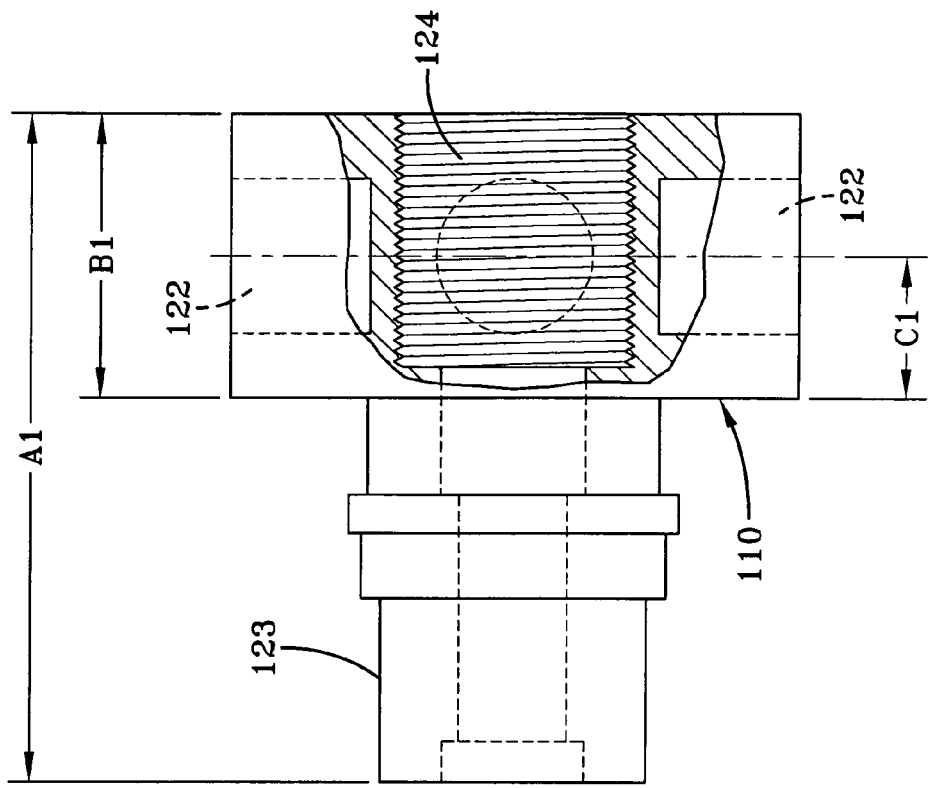
FIG. 5a shows a detailed partially sectioned side view of an adaptor used in accordance with one embodiment of the present invention.
Figure 5:
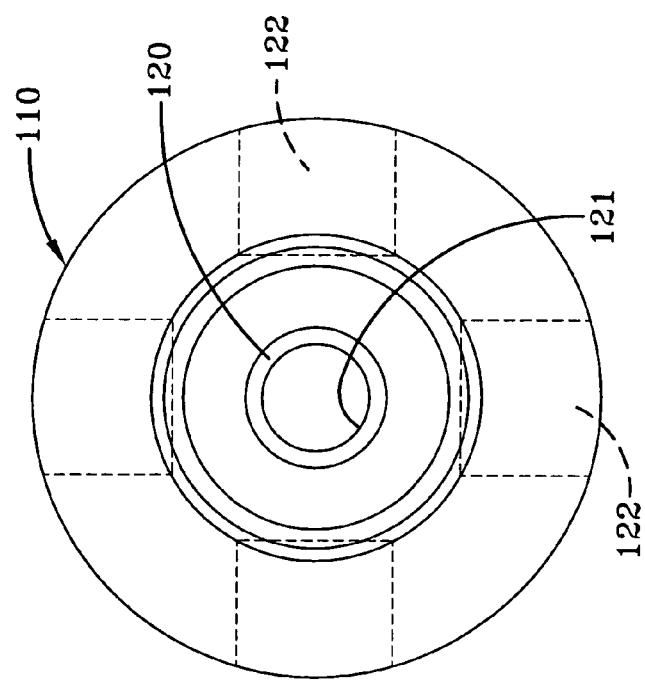
FIG. 5 shows a detailed axial view of an adaptor used in accordance with one embodiment of the present invention.

FIG. 5 shows a detailed axial view of an adaptor 110 for a 3 speed transmission used in accordance with one embodiment of the present invention. FIG. 5 shows adaptor 110 of aluminum having center bore 120 (0.406 inch center bore; 0.116 inch deep), a central bore 121 of 0.257 inch inside diameter and four side bore holes 122 that are ⅜ diameter and 0.375 inch deep.

FIG. 5a shows a detailed partially sectioned side view of an adaptor 110 for a 3 speed transmission used in accordance with one embodiment of the present invention. This view shows the side bore holes 122 and unthreaded portion 123. This view also shows the threaded interior bore 124 that is ⅝ inch 18 tapped 0.700 inch deep. Dimension A1 of FIG. 5a is 1.793 ch. Dimension B1 of FIG. 5a is 0.750 inch. Dimension C1 of FIG. 5a is 0.375 inch. All other dimensions are shown in inches.

In the 3-speed modified transmission the pneumatic transbrake actuator is not threaded. The pneumatic transbrake actuator has a straight turn on the adaptor that slides into a 0.685 inch hole in the modified transmission and is held in place by a U-clamp. This 0.685 inch hole gives access to modified valve body. The 11/16 12 thread tapped hole and the 0.685 inch bored hole was used to hold the vacuum modulator when the transmission was used in a passenger car. The vacuum modulator is not used in the drag race transmission.

The pneumatic transbrake actuator operates on a source of regulated pressure compressed air or gas. This is usually an aluminum bottle that will hold compressed air or gas at 1800 p.s.i. that is passed through a pressure regulator and regulated down to a preset value, typically about 80 to 100 p.s.i.

The pneumatic transbrake actuator system moves a modified or a specially designed plunger, piston or sliding valve forward in a modified or a specially designed valve body in a drag racing transmission. This is done by using regulated pressure compressed air or gas instead of electricity.

The plunger, piston or sliding valve is moved forward through the round chamber in valve body to the reverse gear fluid passages. The race car transmission is put in forward low gear manually by race car driver with a shifter inside the race car. The pump inside the race car transmission is pumping transmission fluid through reverse gear passages putting transmission in reverse gear. With race transmission in reverse and low gear at the same time the race car will stay in a dead still position on the starting line.

In the drag race itself, the pneumatic transbrake actuator operates as follows.

After the burn out is completed the race car driver puts the race car transmission in low gear. The driver drives race car to the starting line and carefully moves the front tires into the roll out zone. The roll out zone is about 11½ inches wide strip across the starting line. There are two light beams a little above ground level across the staring line, one in front of roll out zone and one at rear of roll out zone. The front tire of race car is positioned to block out both beams (forward and rear beams) by pumping of the foot brake pedal by the race car driver. With both beams blocked out, the foot brake pedal is pressed down by race car driver so that the race car will not move. The race car driver will press a button on the steering wheel (this button is called a transbrake button). With the transbrake button pressed and held down by the race car driver, the pneumatic transbrake actuator cycle is started. An electric signal is sent to 3-way air valve 12 which opens and allows, regulated pressure compressed gas or air to flow from air line 18 to air line 16 which flows thru quick exhaust valve 13 into piston side of air cylinder 11. The piston and rod assembly are forced forward in air cylinder 11 the piston compresses a return spring in air cylinder 11 the rod of the piston and rod assembly extends pass the face of the 11/16 threaded end of the adaptor 10. A set distance and comes in contact with plunger, piston, or sliding valve in the modified or specially designed & manufactured valve body assembly for drag racing. With the plunger, piston or sliding valve moved forward in the round chamber of the modified or special valve body at a set distance controlled by air cylinder 11 and held in place by a compression spring or dead stop against the opposite end of plunger, piston or sliding valve that comes in contact with the end of the rod of the air cylinder 11. The plunger, piston or sliding valve is now set at a position that lines up reverse gear fluid passages. The transmission fluid under pressure flows thru the reverse gear passages and puts the drag racing transmission in reverse gear. The drag transmission is held in reverse by action of the pneumatic transbrake actuator and in forward low gear by the race car driver inside race car with a shifter. With race transmission in reverse and low gears at same time the race car will not move forward or backward. This allows the race car driver to take his foot off the foot brake pedal. The race car will not move even when the engine rpm are raised to set "launch off the starting line" rpm.

The race car driver will watch the starting line tree to activate. The race car driver will release the transbrake button at the first sign of one of the three yellow bulbs that will come on in ½ second intervals in a vertical line on the starting line tree. With the transbrake button released the electric signal goes away and the 3-way air valve 12 closes stopping the compressed gas or air. With no compressed gas or air the quick exhaust valve 13 opens. With no gas or air pressure the return spring forces the piston and rod assembly in the air cylinder 11 back to its resting position.

This allows the plunger, piston or sliding valve to move back in round chamber to a dead stop by compression spring or high fluid pressure. In modified or special designed valve body for drag racing. With the plunger, piston or sliding valve against dead stop the fluid passages for reverse gear are closed. The drag race transmission has been taken out of reverse gear. With drag race transmission in forward low gear only and high engine r.p.m. the race launches and accelerates thru ⅛ or ¼ mile drag strip.

The dead stop for the plunger, piston or sliding valve in round chamber of valve body to rest against is the face of the ¹¹⁄₁₆ 12 threaded end of adaptor 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transmission for a race car, said transmission comprising:
   (a) a transmission housing having an exterior;
   (b) a transmission valve body contained in said transmission housing;
   said transmission housing having an aperture connecting said exterior of said transmission housing with said transmission valve body;
   (c) a pneumatic solenoid disposed outside said transmission housing and having an actuating piston extending through said aperture to said transmission valve body, so as to be moveable from a position braking said transmission to a position releasing said transmission;
   (d) a source of compressed air;
   (e) an electrical air control valve to control the supply of compressed air from said source of compressed air to said pneumatic solenoid; and
   (f) a fluid conduit extending from said electrical air control valve to said pneumatic solenoid.

2. A transmission according to claim 1 wherein said electrical air control valve is disposed a sufficient distance from said transmission housing so as to be maintained at a temperature below which said electrical air control unit is subject to failure.

3. A drag race car comprising a transmission of claim 2.

4. A transmission according to claim 1 wherein said electrical air control valve is disposed a sufficient distance from said transmission housing so as to be maintained at a temperature below about 275 F.

5. A drag race car comprising a transmission of claim 4.

6. A transmission according to claim 1 wherein said electrical air control valve is disposed a distance of at least 4 inches from said transmission housing.

7. A drag race car comprising a transmission of claim 6.

8. A transmission according to claim 1 additionally comprising a switch connected to said electrical air control valve, said switch disposed at distance remote from said electrical air control valve.

9. A drag race car comprising a transmission of claim 8.

10. A transmission according to claim 1 wherein said pneumatic solenoid comprises a seal between it and said transmission housing, said seal being of a material resistant to transmission fluid.

11. A drag race car comprising a transmission of claim 10.

12. A drag race car comprising a transmission of claim 1.

* * * * *